(12) United States Patent
Argue et al.

(10) Patent No.: US 9,196,003 B2
(45) Date of Patent: Nov. 24, 2015

(54) PRE-PURCHASE FEEDBACK APPARATUS AND METHOD

(71) Applicant: WAL-MART STORES, INC., Bentonville, AR (US)

(72) Inventors: Stuart Argue, Palo Alto, CA (US); Anthony Emile Marcar, San Francisco, CA (US)

(73) Assignee: WAL-MART STORES, INC., Bentonville, AR (US)

( * ) Notice: Subject to any disclaimer, the term of this patent is extended or adjusted under 35 U.S.C. 154(b) by 0 days.

(21) Appl. No.: 13/722,939

(22) Filed: Dec. 20, 2012

(65) Prior Publication Data

US 2014/0180855 A1    Jun. 26, 2014

(51) Int. Cl.
| G06G 1/12 | (2006.01) |
| G06Q 30/00 | (2012.01) |
| G06F 15/16 | (2006.01) |
| G06Q 30/06 | (2012.01) |

(52) U.S. Cl.
CPC .................................. *G06Q 30/0631* (2013.01)

(58) Field of Classification Search
USPC .......................................................... 705/21
See application file for complete search history.

(56) References Cited

U.S. PATENT DOCUMENTS

| | | | |
|---|---|---|---|
| 6,513,059 B1 | 1/2003 | Gupta | |
| 6,587,835 B1 | 7/2003 | Treyz | |
| 6,901,379 B1 * | 5/2005 | Balter et al. | 705/27.2 |
| 6,957,393 B2 | 10/2005 | Fano | |
| 7,580,699 B1 | 8/2009 | Shaw | |
| 7,647,247 B2 * | 1/2010 | Abraham et al. | 705/26.2 |
| 8,065,173 B2 | 11/2011 | Abu-Hakima | |
| 8,266,020 B2 | 9/2012 | Young | |
| 8,271,352 B2 * | 9/2012 | Lifson | 705/26.7 |
| 8,332,294 B1 * | 12/2012 | Thearling | 705/35 |
| 8,359,285 B1 * | 1/2013 | Dicker et al. | 706/45 |
| 8,401,924 B1 * | 3/2013 | Rajyaguru et al. | 705/26.61 |
| 8,504,621 B2 | 8/2013 | Ruff | |
| 2002/0170961 A1 | 11/2002 | Dickson | |
| 2003/0172004 A1 * | 9/2003 | Anderson | 705/27 |
| 2004/0153511 A1 * | 8/2004 | Maynard et al. | 709/206 |
| 2004/0230511 A1 * | 11/2004 | Kannan et al. | 705/35 |
| 2005/0177446 A1 * | 8/2005 | Hoblit | 705/26 |
| 2005/0222918 A1 * | 10/2005 | Vanska et al. | 705/26 |
| 2007/0138268 A1 * | 6/2007 | Tuchman | 235/383 |
| 2007/0276721 A1 * | 11/2007 | Jackson | 705/10 |

(Continued)

FOREIGN PATENT DOCUMENTS

| EP | 1170690 A1 | 1/2002 |
| WO | WO2012172568 A1 | 12/2012 |

*Primary Examiner* — Ashford S Hayles
(74) *Attorney, Agent, or Firm* — Howard & Howard Attorneys PLLC (57) ABSTRACT

A computer-implemented method is disclosed for enabling pre-purchase feedback. Within the method, a primary customer carrying a first computing device may be received within a brick-and-mortar store. A computer system corresponding to the store may receive via the first computing device an instruction to share with a secondary customer data describing a proposed purchase of one or more products. The computer system may then pass the data to a second computing device corresponding to the secondary customer. The computer system may also receive, via the second computing device, feedback corresponding to the proposed purchase and pass the feedback to the first computing device. Accordingly, the primary customer may receive pre-purchase feedback from the secondary customer.

18 Claims, 7 Drawing Sheets

(56) References Cited

U.S. PATENT DOCUMENTS

| | | | |
|---|---|---|---|
| 2007/0282658 A1* | 12/2007 | Brintle | 705/9 |
| 2008/0071602 A1* | 3/2008 | Ojakaar et al. | 705/10 |
| 2009/0006181 A1* | 1/2009 | Ghosh et al. | 705/10 |
| 2009/0070228 A1* | 3/2009 | Ronen | 705/26 |
| 2009/0070412 A1* | 3/2009 | D'Angelo et al. | 709/203 |
| 2009/0313101 A1* | 12/2009 | McKenna et al. | 705/14.25 |
| 2010/0030578 A1 | 2/2010 | Siddique | |
| 2010/0049581 A1* | 2/2010 | Bantz et al. | 705/9 |
| 2010/0191578 A1* | 7/2010 | Tran et al. | 705/10 |
| 2010/0235249 A1* | 9/2010 | Smith et al. | 705/18 |
| 2010/0280920 A1* | 11/2010 | Scott et al. | 705/27 |
| 2010/0318404 A1* | 12/2010 | Jain et al. | 705/10 |
| 2010/0332283 A1* | 12/2010 | Ng et al. | 705/9 |
| 2011/0016023 A1* | 1/2011 | Zakas | 705/27.1 |
| 2011/0125598 A1* | 5/2011 | Shin et al. | 705/17 |
| 2011/0145093 A1 | 6/2011 | Paradise | |
| 2011/0184831 A1* | 7/2011 | Dalgleish | 705/26.7 |
| 2011/0307307 A1* | 12/2011 | Benmbarek | 705/14.4 |
| 2011/0307340 A1* | 12/2011 | Benmbarek | 705/14.73 |
| 2011/0307397 A1* | 12/2011 | Benmbarek | 705/319 |
| 2011/0307478 A1* | 12/2011 | Pinckney et al. | 707/724 |
| 2011/0313803 A1* | 12/2011 | Friend et al. | 705/7.13 |
| 2011/0320250 A1* | 12/2011 | Gemmell et al. | 705/14.16 |
| 2012/0005105 A1* | 1/2012 | Beier et al. | 705/303 |
| 2012/0095862 A1* | 4/2012 | Schiff et al. | 705/26.7 |
| 2012/0095863 A1* | 4/2012 | Schiff et al. | 705/26.7 |
| 2012/0114116 A1* | 5/2012 | Sulaiman et al. | 380/28 |
| 2012/0116924 A1* | 5/2012 | Seo | 705/27.1 |
| 2012/0123675 A1* | 5/2012 | Parker, II | 701/426 |
| 2012/0150631 A1* | 6/2012 | Root et al. | 705/14.49 |
| 2012/0158589 A1* | 6/2012 | Katzin et al. | 705/44 |
| 2012/0173351 A1 | 7/2012 | Hanson | |
| 2012/0203644 A1* | 8/2012 | Phillips | 705/17 |
| 2012/0231816 A1* | 9/2012 | Kubo | 455/456.3 |
| 2012/0233003 A1* | 9/2012 | Calman et al. | 705/16 |
| 2012/0234907 A1 | 9/2012 | Clark | |
| 2012/0239479 A1* | 9/2012 | Amaro et al. | 705/14.23 |
| 2012/0239504 A1* | 9/2012 | Curlander et al. | 705/14.66 |
| 2012/0265800 A1* | 10/2012 | Tuchman et al. | 709/203 |
| 2012/0290609 A1* | 11/2012 | Britt | 707/769 |
| 2013/0041733 A1* | 2/2013 | Officer et al. | 705/14.16 |
| 2013/0041781 A1* | 2/2013 | Freydberg | 705/27.1 |
| 2013/0041837 A1* | 2/2013 | Dempski et al. | 705/345 |
| 2013/0054328 A1* | 2/2013 | Chavie et al. | 705/14.23 |
| 2013/0054365 A1* | 2/2013 | Sabur | 705/14.55 |
| 2013/0054698 A1* | 2/2013 | Lee et al. | 709/204 |
| 2013/0066551 A1* | 3/2013 | Bednar et al. | 701/526 |
| 2013/0066750 A1* | 3/2013 | Siddique et al. | 705/27.2 |
| 2013/0073363 A1* | 3/2013 | Boal | 705/14.23 |
| 2013/0074076 A1* | 3/2013 | Lindenfeld et al. | 718/100 |
| 2013/0103537 A1 | 4/2013 | Hewett | |
| 2013/0103539 A1* | 4/2013 | Abraham et al. | 705/26.8 |
| 2013/0124361 A1* | 5/2013 | Bryson | 705/26.7 |
| 2013/0211953 A1 | 8/2013 | Abraham | |
| 2013/0231990 A1* | 9/2013 | Munjal et al. | 705/14.23 |
| 2013/0254304 A1* | 9/2013 | Van Nest et al. | 709/206 |
| 2013/0263008 A1* | 10/2013 | Bylahalli et al. | 715/739 |
| 2013/0282533 A1* | 10/2013 | Foran-Owens et al. | 705/27.1 |
| 2013/0297449 A1* | 11/2013 | Zakas et al. | 705/26.8 |
| 2014/0052562 A1* | 2/2014 | Oliveira et al. | 705/26.5 |
| 2014/0129378 A1* | 5/2014 | Richardson | 705/26.8 |

* cited by examiner

From: Jack (jack@gmail.com)
Sent: Monday, November 19, 2012 1:12 PM
To: Jill (jill@gmail.com)
Subject: Proposed Purchase Jill, Jack is ready to check out and wants to make sure he has everything you need.

*DAISY Light Sour Cream* 16oz $2.25
*WONDER Cottage White Bread* 20oz $1.99
*OAK FARMS 1% Low Fat Milk* 1gal $3.25

( Looks Good )
( Suggest Changes )

FIG. 7

PRE-PURCHASE FEEDBACK APPARATUS AND METHOD

BACKGROUND

1. Field of the Invention

This invention relates to shopping systems and more particularly to systems and methods for sharing a description of a proposed purchase with a spouse, partner, or the like so that any necessary feedback from that person may be received and acted upon before the purchase is finalized.

2. Background of the Invention

Many shopping systems currently in use today do not support important emerging technologies, services, and marketing opportunities. For example, many shopping systems are limited in their ability to share purchase data. As a result, those systems cannot effectively implement many novel methods and services surrounding such data. Accordingly, what is needed is an apparatus and method expanding the ability of a wide variety of shopping systems and supporting computer systems to communicate and share purchase data.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

Figure 1:
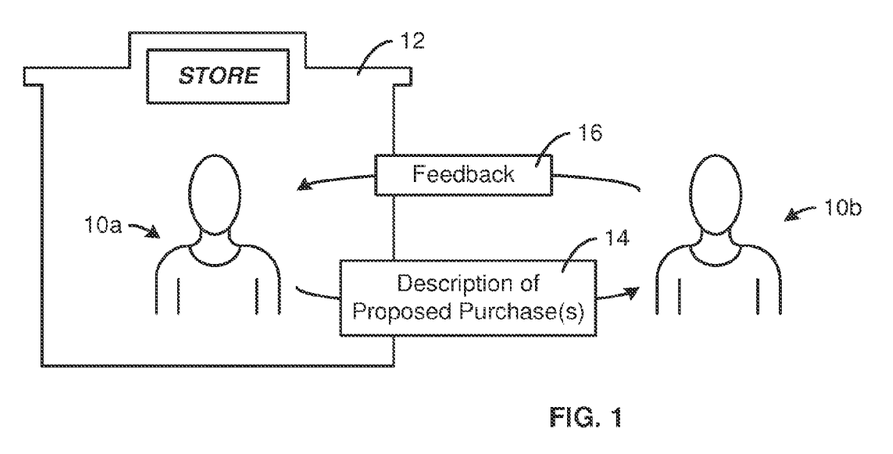
FIG. 1 is a schematic diagram illustrating the passing of a description of a proposed purchase and feedback corresponding thereto between a primary customer located inside a store and a secondary customer located outside the store.

Referring to FIG. 1, in selected embodiments or situations, an individual shopping within a business, retail store, or the like may need or desire certain information or feedback from someone spaced some distance therefrom. For example, in certain situations, an individual doing the shopping may not be the most knowledgeable about the item or items to be purchased. Accordingly, the individual may need or desire feedback from a distant individual to confirm whether a proposed purchase contains the correct item or items. Alternatively, the individual doing the shopping may not be aware of certain items desired by the distant individual. Accordingly, the individual may need or desire feedback from the distant individual to confirm whether a proposed purchase contains all of the desired or necessary items.

Such situations may often arise among individuals forming part of a household. For example, a first spouse may be the primary food preparer in a particular household. However, at certain times the first spouse may not be the one doing the grocery shopping. Accordingly, it may be necessary for the second spouse to, while shopping, confer with the first spouse to ensure that all the desired items are being purchased, that the correct items are being purchased, or the like. In selected embodiments, a system in accordance with the present invention may enable such communication in an efficient manner.

For example, in selected embodiments, a first individual may be characterized as a primary customer 10a. The primary customer 10a may be the person shopping within a store 12. A second individual may be characterized as a secondary customer 10b. The secondary customer 10b may be spaced some distance from the primary customer 10a. In certain situations, the secondary customer 10b may occupy a location inside the store 12, but some distance from the primary customer 10a. However, more typically, the secondary customer 10b may occupy a location outside of the store 12 (e.g., at home, at work, or the like). As a result, normal conversation between the primary and secondary customers 10a, 10b may not be possible.

Accordingly, in selected embodiments, a system in accordance with the present invention may enable a primary customer 10a to send a description 14 of a proposed purchase to the secondary customer 10b. The secondary customer 10b may review the description 14 of the proposed purchase. A system may further enable the secondary customer 10b to send feedback 16 corresponding to the proposed purchase to the primary customer 10a. After reviewing the feedback 16, the primary customer 10a may leave the proposed purchase unchanged, alter the proposed purchase as desired or necessary, or the like. Accordingly, when subsequently executing or finalizing the actual purchase, the primary customer 10a may be sure that the desires and/or needs of the secondary customer 10b have been considered.

Embodiments in accordance with the present invention may be embodied as an apparatus, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "module" or "system." Furthermore, the present invention may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. In selected embodiments, a computer-readable medium may comprise any non-transitory medium that can contain, store, communicate, propagate, or transport the program for use by or in connection with the instruction execution system, apparatus, or device.

Computer program code for carrying out operations of the present invention may be written in any combination of one or more programming languages, including an object-oriented programming language such as Java, Smalltalk, C++, or the like and conventional procedural programming languages, such as the "C" programming language or similar programming languages. The program code may execute entirely on a computer of a point-of-sale (POS) system, partly on a POS computer, as a stand-alone software package, on a stand-alone hardware unit, partly on a remote computer spaced some distance from the POS computer, or entirely on a remote computer or server. In the latter scenario, the remote computer may be connected to the POS computer through any type of network, including a local area network (LAN) or a wide area network (WAN), or the connection may be made to an external computer (e.g., through the Internet using an Internet Service Provider).

Embodiments can also be implemented in cloud computing environments. In this description and the following claims, "cloud computing" is defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions or code. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 2:
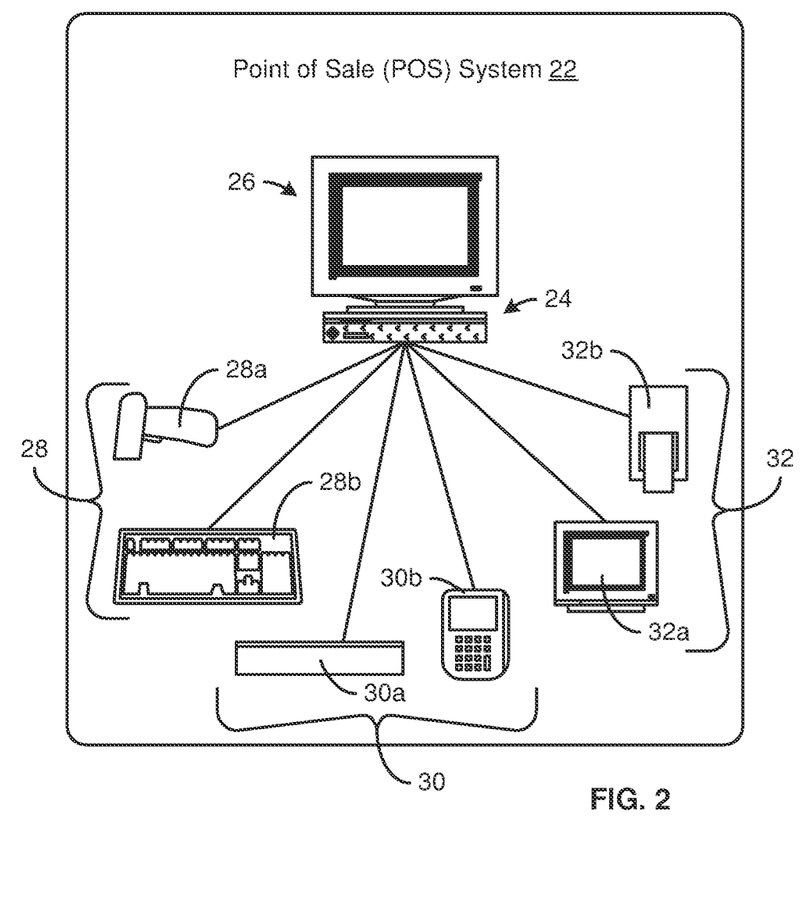
FIG. 2 is a schematic block diagram of one embodiment of a point-of-sale (POS) system for implement methods in accordance with the present invention.

Referring to FIG. 2, in selected embodiments, the hardware, software, or hardware and software of a POS system 22 may be configured to implement one or more methods in accordance with the present invention. A POS system 22 in accordance with the present invention may include various components. In certain embodiments, a POS system 22 may include a central or primary computer 24, a monitor 26 (e.g., a cashier-facing monitor 26), one or more input devices 28 (e.g., scanners 28a, keyboards 28b, scales, or the like), one or more payment devices 30 (e.g., cash drawers 30a, card readers 30b) for receiving or returning payments, one or more output devices 32 (e.g., customer-facing display 32a or monitor 32a, receipt printer 32b), or the like or combinations or sub-combinations thereof.

A computer 24 may form the primary processing unit of a POS system 22. Other components 28, 30, 32 forming part of a POS system 22 may communicate with the computer 24. Input devices 28 and certain payment devices 30 may feed data and commands to a computer 24 for processing or implementation. For example, a scanner 28a may pass data communicating the identity of one or more items to be purchased, returned, or the like to a computer 24. Similarly, a card reader 30b may pass payment information to a computer 24.

Conversely, output devices 32 and certain payment devices 30 may follow or implement commands issued by a computer 24. For example, a cash drawer 30a may open in accordance with the commands of a computer 24. Similarly, a customer-facing display 32a and receipt printer 32b may display or output data or information as instructed by a computer 24.

In selected embodiments, in addition to handling consumer transactions (e.g., purchases, returns), a POS system 22 may also provide or support certain "back office" functionality. For example, a POS system 22 may provide or support inventory control, purchasing, receiving and transferring products, or the like. A POS system 22 may also store sales and customer information for reporting purposes, marketing purposes, receivables management, trend analysis, cost analysis, price analysis, profit analysis, or the like. If desired or necessary, a POS system 22 in accordance with the present invention may include an accounting interface to pass certain information to one or more in-house or independent accounting applications.

Figure 3:
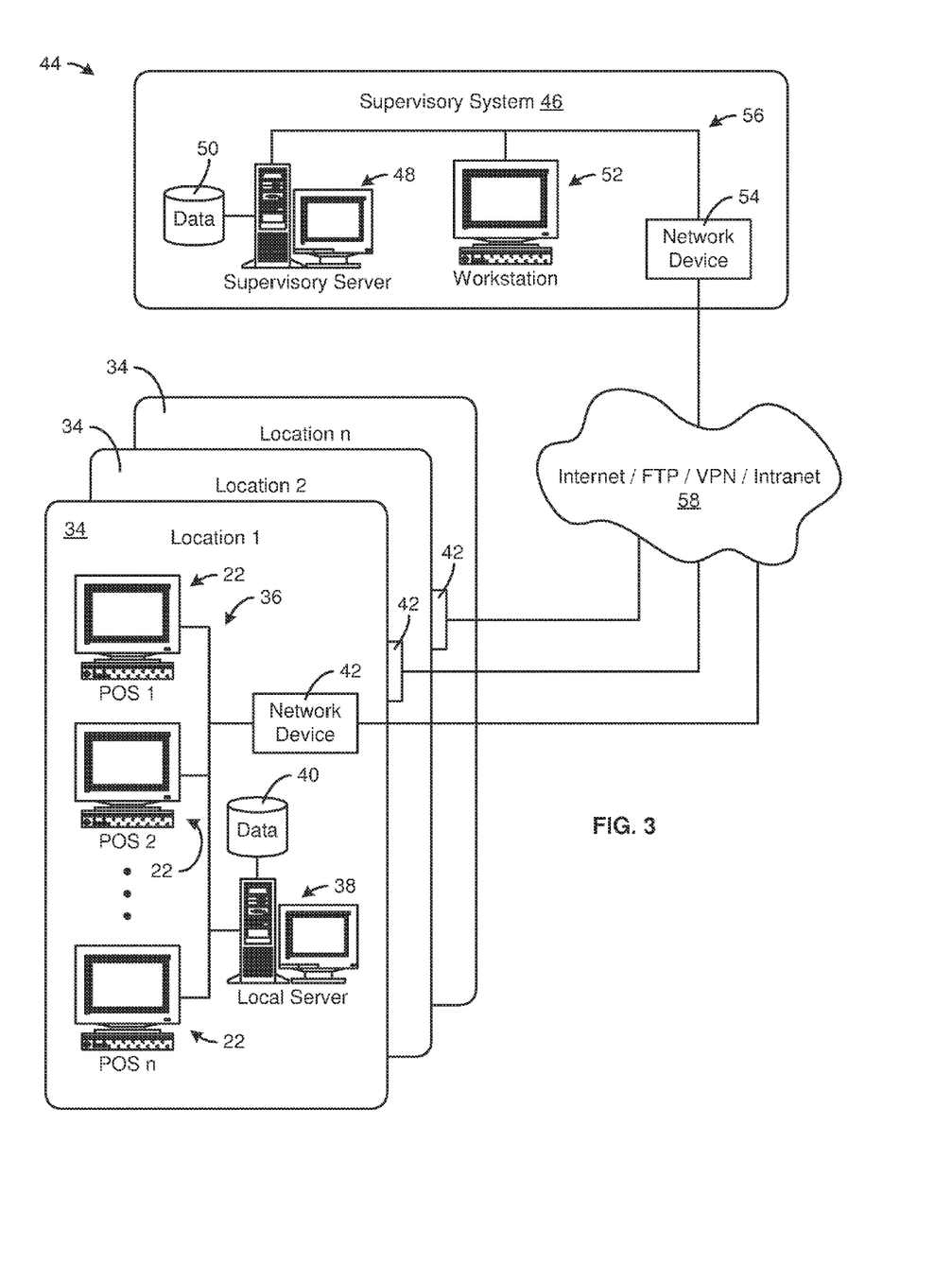
FIG. 3 is a schematic block diagram of one embodiment of multiple POS systems in accordance with the present invention operating in the context of an enterprise-wide system.

Referring to FIG. 3, in selected embodiments, a POS system 22 may operate substantially independently, as a stand-alone unit. Alternately, a POS system 22 in accordance with the present invention may be one of several POS systems 22 forming the front line of a larger system. For example, multiple POS systems 22 may operate at a particular location 34 (e.g., within a retail, brick-and-mortar store). In such embodiments, the various POS systems 22 may be interconnected via a LAN 36. A LAN 36 may also connect the POS systems 22 to a local server 38.

A local server 38 may support the operation of the associated POS systems 22. For example, a server 38 may provide a central repository from which certain data needed by the associated POS systems 22 may be stored, indexed, accessed, or the like. A server 38 may serve certain software to one or more POS systems 22. In certain embodiments, a POS system 22 may offload certain tasks, computations, verifications, or the like to a server 38.

Alternatively, or in addition thereto, a server 38 may support certain back office functionality. For example, a server 38 may receive and compile (e.g., within one or more associated databases 40) data from the various associated POS systems 22 to provide or support inventory control, purchasing, receiving and transferring products, or the like. A server 38 may also receive and compile sales and customer information for reporting purposes, marketing purposes, receivables management, trend analysis, cost analysis, price analysis, profit analysis, or the like.

In certain embodiments, one or more POS systems 22 or servers 38 corresponding to a particular location 34 may communicate with or access one or more remote computers or resources via one or more network devices 42. For example, a network device 42 may enable a POS system 22 to contact outside resources and verify the payment credentials (e.g., credit card information) provided by a customer. A network device 42 may comprise a modem, router, or the like.

In selected embodiments, a POS system 22 in accordance with the present invention may operate within an enterprise-wide system 44 comprising multiple locations 34 (e.g., branches 34 or stores 34). In such embodiments, each location 34 may have one or more POS systems 22, local servers 38, local databases 40, network devices 42, or the like or combinations or sub-combinations thereof connected by a computer network (e.g., a LAN 36). Additionally, each such location 34 may be configured to interact with one or more supervisory systems 46. For example, multiple branch locations 34 may report to an associated "headquarters" location or system.

A supervisory system 46 may comprise one or more supervisory servers 48, databases 50, workstations 52, network devices 54, or the like or combinations or sub-combinations thereof. The various components of a supervisory system 46 may be interconnected via a computer network (e.g., a LAN 56). In selected embodiments, a supervisory system 46 may comprise one or more supervisory servers 48 providing a central repository from which certain data needed by the one or more POS systems 22 or local servers 38 may be stored, indexed, accessed, or the like.

Alternatively, or in addition thereto, a supervisory server 48 may receive and compile (e.g., within one or more associated databases 50) data from the various associated POS systems 22 or local servers 38 to provide or support inventory control, purchasing, receiving and transferring products, or the like. A supervisory server 48 may also receive and compile sales and customer information for reporting purposes, marketing purposes, receivables management, trend analysis, cost analysis, price analysis, profit analysis, or the like.

A supervisory system 46 may be connected to one or more associated locations 34 or branches 34 in via any suitable computer network 58 (e.g., WAN 58). For example, in selected embodiments, one or more locations 34 may connect to a supervisor system 46 via the Internet. Communication over such a network 58 may follow any suitable protocol or security scheme. For example, communication may utilize the File Transfer Protocol (FTP), a virtual private network (VPN), intranet, or the like.

In selected embodiments, a POS system 22 may collect and/or generate receipt data. Receipt data may document a transaction (e.g., sale or return) carried out by a POS system 22. Receipt data may be presented or displayed to a customer in the form of an electronic (e.g., paperless) receipt. In selected embodiments, receipt data may be delivered to a customer's computing device (e.g., a mobile telephone, personal digital assistant (PDA), media player, tablet computer or reader, laptop computer, desktop computer, or the like, hereinafter a "computing device") by an entity's computer system (e.g., a system comprising one or more POS systems 22, local servers 38, supervisory servers 48, some other onsite resources, one or more applications running on a customer's computing device, some other offsite resources, or the like or combinations or sub-combinations thereof, hereinafter a "computer system").

A computer system in accordance with the present invention may deliver receipt data to a computing device of a customer in any suitable manner. In selected embodiments, a computer system may generate and provide or present a code. By scanning the code (e.g., scanning the code using a camera on a computing device), a consumer may import receipt data encoded within the code. Alternatively, scanning the code may initiate the download of receipt data.

Alternatively, in selected embodiments, a computer system may collect a unique identification or membership number from a customer. This may be done when a membership card, club card, loyalty card, identification card, credit card, debit card, fingerprint or other biometric characteristic, or the like is scanned, input, or otherwise collected at a POS system 22. In other situations, a cashier or customer may type in a unique identification number (e.g., telephone number), payment number, membership number, or the like at a POS system 22. Once the identification information is received, it may be used to pass receipt data to a computing device of a corresponding customer. For example, identification information may enable a computer system to tie or link a current transaction to an appropriate computing device or account and to deliver receipt data thereto.

Figure 4:
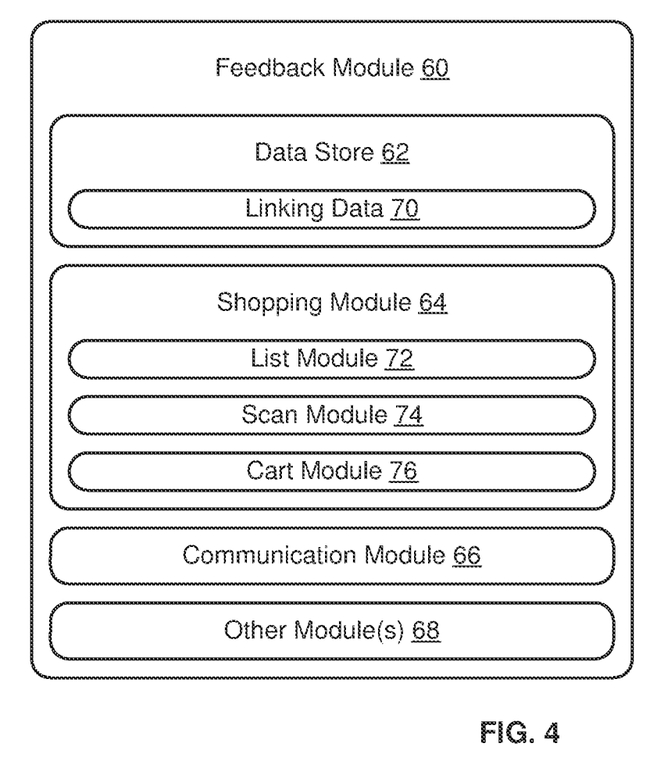
FIG. 4 is a schematic block diagram of one embodiment of a feedback module in accordance with the present invention.

Referring to FIG. 4, in selected embodiments, one or more computers, computers systems, computing devices, or the like or a combination or sub-combination thereof may support or enable a feedback module 60. A feedback module 60 may enable pre-purchase feedback. For example, a feedback module 60 may enable a primary customer 10a to receive pre-purchase feedback form a secondary customer 10b (e.g., a spouse, partner, parent, or the like of the primary customer 10a) spaced some distance from the primary customer 10a.

A feedback module 60 may include any suitable arrangement of sub-components or modules. In certain embodiments, a feedback module 60 may include a data store 62, shopping module 64, communication module 66, one or more other modules 68 as desired or necessary, or the like or a combination or sub-combination thereof.

A data store 62 may contain records supporting the operation of a feedback module 60. In selected embodiments, a data store 62 may contain or store linking data 70. Linking data 70 may correspond to and/or identify relationships between two or more customers 10. For example, linking data 70 may provide information and/or authorizations enabling communications from one or more computing devices, accounts, applications, or the like associated with one or more primary customers 10a to reach one or more computing devices, accounts, applications, or the like associated with one or more corresponding secondary customers 10b.

Linking data 70 may identify computing devices, accounts, applications, customers 10, or the like in any suitable method. For example, in selected embodiments, linking data 70 may use telephone numbers, retailer-specific identification codes or numbers, or the like or a combination thereof. Accordingly, systems in accordance with the present invention and the modules corresponding thereto may accurately identify and communicate with appropriate customers 10.

A shopping module 64 may support one or more customers 10 (e.g., one or more primary customers 10a) in their shopping efforts. To do so, a shopping module 64 may include any suitable arrangement of sub-components or sub-modules. In certain embodiments, a shopping module 64 may include a list module 72, input module 74, cart module 76, one or more other modules as desired or necessary, or the like or a combination or sub-combination thereof.

A list module 72 may support one or more customers 10 in creating, modifying, and/or using a shopping list. The amount of detail supported by a list module 72 may vary between embodiments. In certain embodiments, a list module 72 may receive and/or list one or more products using simple generic names (e.g., sour cream, bread, milk). In other embodiments, a list module 72 may support or require greater detail. For example, a list module 72 may receive and/or list one or more product using brand names, product-specific descriptions, sizes and/or weights, prices, or the like or a combination or sub-combination thereof.

While shopping, a list module 72 may enable a shopper (e.g., a primary customer 10a) to "check off" one or more products as they are physically obtained (e.g., physically added to an actual shopping cart, shopping basket, or the like within a store 12). This may enable the shopper to easily see which products are still needed. Additionally, in selected embodiments, the designating of a product as obtained may be a trigger for a cart module 76 to add the product to a proposed purchase.

A scan module 74 may enable a shopper to input, import, or identify a product through a scan of the product. For example, a scan module 74 may enable a computing device of a primary customer 10a to scan a Universal Product Code (UPC), other code, or the like and input, import, or identify the corresponding product. In selected embodiments, the scanning of a product may add (if not already present) the product to a current or active shopping list and/or designate the product as obtained. Alternatively, or in addition thereto, the scanning of a product may be a trigger for a cart module 76 to add the product to a proposed purchase.

A cart module 76 may collect, support, and/or provide a repository for a proposed purchase. Accordingly, a cart module 76 may maintain a list of one or more products that a primary customer 10a has proposed to purchase. In selected embodiments, a cart module 76 may support a virtual representation of what actually resides in the physical cart, basket, or the like of the primary customer 10a. In certain embodiments, a cart module 76 may receive and/or list one or more products forming a proposed purchase using simple generic names. Alternatively, a cart module 76 may support or require greater detail. For example, a cart module 76 may receive and/or list one or more products of a proposed purchase using brand names, product-specific descriptions, sizes and/or weights, prices, or the like or a combination or sub-combination thereof. In either case, a cart module 76 may output or provide a source for obtaining a description 14 of a proposed purchase A communication module 66 may support or enable the passing or communicating of one or more descriptions 14 of proposed purchases and corresponding feedback 16 between one or more primary customers 10a and associated secondary customers 10b. In selected embodiments, a shopping module 64 may present a primary customer 10a with an option to share his or her proposed purchase with one or more secondary customers 10b. When the primary customer 10a exercises that option, a communication module 66 may make it happen.

For example, a shopping module 66 may present a "Get Feedback from Jill" button to Jack, a particular primary customer 10a. The fact that Jill may be an appropriate secondary customer 10b for Jack 10a may be documented within and/or drawn from linking data 70 (e.g., the button may be created and/or customized using linking data 70). Information for reaching Jill may also be documented within and/or drawn from linking data 70. Accordingly, should Jack select the button, a communication module 66 may be able to appropriately share a description 14 of the proposed purchase with Jill. Moreover, should Jill elect to send feedback 16 to Jack regarding the proposed purchase, a communication module 66 may be able to appropriately share the feedback 16 with Jack.

In selected embodiments, a communication module 66 may support communication between a first computing device corresponding to a primary customer 10a and a second computing device corresponding to a secondary customer 10b. This may be done in any suitable manner. In certain embodiments, communication between computing devices may comprise notifications (e.g., push notifications, application notifications), text messages (e.g., SMS messages, MMS messages), email messages, data passed from hyperlinks to webpages, data passed between webpages, other forms of computer or network communication, or the like or a combination or sub-combination thereof.

For example, in selected embodiments, a primary customer 10a may have a first instance of a particular application installed on a mobile computing device in his or her possession and carried by him or her within a store 12. The first instance may comprise a retailer's mobile application, an electronic receipts application, or the like or a combination or sub-combination thereof. Additionally, the first instance may enable, support, or embody one or more functions or modules corresponding to a feedback module 60. Accordingly, a primary customer 10a may use the first instance to view a shopping list, modify a shopping list, check off a product on a shopping list, scan a product, view a proposed purchase, modify a proposed purchase, elect to share a description 14 of the proposed purchase, or the like or a combination or sub-combination thereof.

A second instance of the particular application (or an instance of an application related to the particular application) may be installed on a second computing device corresponding to a secondary customer 10b. Accordingly, a communication module 66 may pass a description 14 of a proposed purchase from the first instance to the second instance. Alternatively, or in addition thereto, a communication module 66 may pass feedback 16 from the second instance to the first instance. This may be done via application notifications (e.g., notifications or messages corresponding to an application delivered by a server directly to the application) when the receiving application is up and running. Alternatively, should the receiving application not be running, the passing of a description 14 or feedback 16 may be accomplished (or at least initiated) via a push notification.

Alternatively, a communication module 66 may pass a description 14 of a proposed purchase or corresponding feedback 16 using one or more general, non-application-specific means of communication. This may be accomplished on a computing device itself or on one or more servers in communication with a computing device. For example, in selected embodiments, a description 14 of a proposed purchase may be converted to a SMS message, MMS message, email, or the like that is sent directly from a computing device carried by a primary customer 10a. Alternatively, a description 14 of a proposed purchase may be converted to a SMS message, MMS message, email, or the like and sent by a server that is in communication with a computing device carried by a primary customer 10a.

Feedback 16 to a description 14 delivered via SMS message, MMS message, email, or the like may be communicated in any suitable manner. For example, in selected embodiments, feedback 16 issued in response to a description 14 delivered via SMS message, MMS message, email, or the like may be communicated in like manner. Alternatively, a description 12 delivered via SMS message, MMS message, email, or the like may contain one or more hyperlinks. By selecting an appropriate hyperlink, a secondary customer 10b may issue or initiate a desired feedback 16.

For example, by selecting a particular hyperlink, a secondary customer 10b may issue "canned" feedback 16 (e.g., "Looks Good" feedback 16). Alternatively, by selecting a different hyperlink, a secondary customer 10b may be directed to a webpage where customized feedback 16 may be generated and/or sent. Data (e.g., a lengthy numeric code) within a hyperlink may enable a communication module 66 to maintain continuity and integrity for any given exchange of description 14 and/or feedback 16 between corresponding primary and secondary customers 10a, 10b.

The various functions or modules of a feedback module 60 may be enacted or implemented by any suitable system or component thereof. For example, in selected embodiments, one or more functions or modules of a feedback module 60 may be distributed across one or more hardware devices, including a primary computer 24 of a POS system 22, a local server 38, a supervisory server 48, some other onsite resource, a computing device, one or more application installed on a computing device, some other offsite resource, or the like or combinations or sub-combinations thereof. Thus, systems and methods in accordance with the present invention may be adapted to a wide variety of situations, including more rigid legacy systems.

Figure 5:
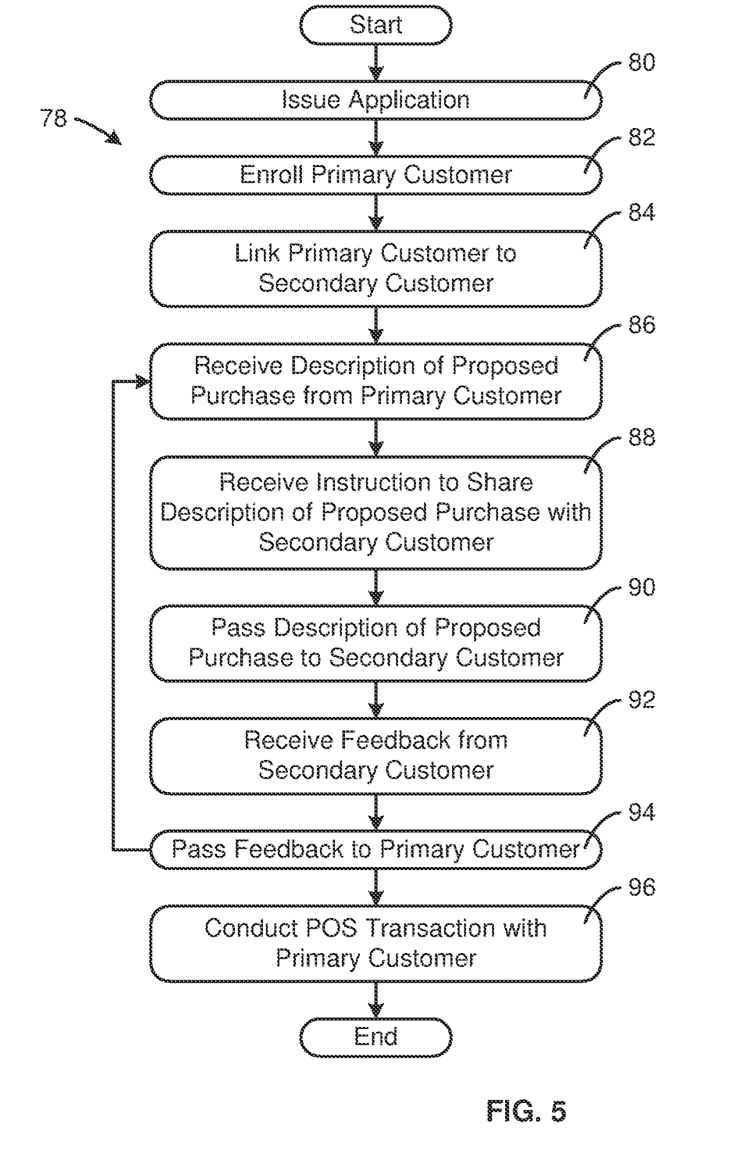
FIG. 5 is a block diagram of one embodiment of a method for passing a description of a proposed purchase and feedback corresponding thereto between a primary customer and a secondary customer spaced some distance from the primary customer.

Referring to FIG. 5, one method 78 in accordance with the present invention may begin when an appropriate application (e.g., a retailer's mobile application, an electronic receipts application, an application supporting feedback 16 in accordance with the present invention, or the like or a combination or sub-combination thereof) is issued 80 and installed on a computing device of a primary customer 10a. A computer system may then enroll 82 the primary customer 10a.

In selected embodiments, this enrollment 82 may result in the primary customer 10a being linked 84 to one or more secondary customers 10b. For example, enrollment 82 in a program or system supporting feedback 16 in accordance with the present invention may result in the primary customer 10a being prompted to enter certain identifying information (e.g., names, nicknames, mobile telephone numbers, email addresses, account numbers, or the like) corresponding to a spouse, partner, or some other person that is to be available as secondary customer 10b.

Additionally, in selected embodiments, enrollment 82 may result in a computing device (or an application installed thereon) of a customer 10 being linked to or associated with certain identification information within the records of a computer system. In still other embodiments, the enrollment 82 may be independent of any specific computing device. For example, in certain embodiments, enrollment 82 may comprise the generation of an account. The customer may then access the account (e.g., "log into" the account) using a computing device. Accordingly, a customer may access the account via any one of several computing devices. Moreover, by "logging out" of an account, the corresponding computing device may be separated from the account.

So prepared, a primary customer 10a may enter a "brick-and-mortar" business location with a first computing device (e.g., a computing device possessed or carried by the primary customer 10a) and identify one or more products he or she proposes to purchase. A computer system may receive 86 via the first computing device a description 14 of that proposed purchase. The description 14 may be a virtual or computerized representation or listing of the product or products the primary customer proposes to purchase. In selected embodiments or situations, this may comprise a representation or listing of the product or products the primary customer has literally placed in a physical shopping cart, basket, bag, or the like.

The receipt 86 of the description 14 by a computer system may be accomplished in any suitable manner. For example, it may be accomplished as the primary customer 10a checks off items on a shopping list on a first computing device, scans products (e.g., scans UPC codes or the like of selected products) with a first computing device, or the like or a combination thereof.

At some point, a computer system may receive 88 an instruction to share data describing the proposed purchase with a secondary customer 10b. In selected embodiments, the instruction may be received 88 from the primary customer 10a via a first computing device while the primary customer 10a is within the brick-and-mortar store.

In certain embodiments, an instruction to share may correspond to, and be received 88 as, a single event. For example, the receiving 88 of the instruction may correspond to (e.g., substantially immediately follow) the selection by the primary customer 10a of a "share" button or command on a first computing device. Accordingly, in response to such an instruction, a description 14 of a purchase currently proposed may be passed 90 to a second computing device (e.g., a computing device possessed or carried by or corresponding to the secondary customer 10b) in a single event or bulk transfer or communication.

Alternatively, the instruction received 88 may correspond to or indicate a feed of data extending over a selected period of time (e.g., over a browsing and selecting portion of a shopping experience). Accordingly, in response to such an instruction, a description 14 of a proposed purchase may be passed 90 piecemeal to a second computing device. For example, a description 14 of each product may be passed 10 to a second computing device as the product is checked off a shopping list on a first computing device, scanned by a first computing device, or the like. Thus, a description 14 of a proposed purchase may be passed 90 to a second computing device once the proposed purchase is completely assembled or piecemeal in real time as the proposed purchase is assembled.

Sometime after a description 14 of a proposed purchase or a portion of a proposed purchase has been passed 90, a computer system may receive 92 feedback 16 corresponding to the proposed purchase from the secondary customer 10b. In selected embodiments, the feedback 16 may be received 92 from the secondary customer 10b via a second computing device while the primary customer 10a is within the brick-and-mortar store. Accordingly, the feedback 16 may be passed 94 to the primary customer 10a via the first computing device before the primary customer 10a finalizes a corresponding purchase, leaves the store 12, or the like.

In view of the feedback 16 a primary customer 10a may modify a proposed purchase (e.g., drop one or more products, swap out one or more products, add one or more products, or the like or a combination or sub-combination thereof) or leave the proposed purchase unchanged. In selected embodiments or situations, a description 14 of a revised proposed purchase may then be received 86 by a computer system and certain portions 88, 90, 92, 94 of the method 78 may be repeated. Whenever a current version of a proposed purchase is deemed by the primary customer 10*a* to be complete, a computer system may conduct 96 a POS transaction finalizing the purchase. For example, the primary customer 10*a* may approached a POS system 22, where a purchase of one or more products may be initiated and completed. In selected embodiments, conducting 96 the transaction may include delivering or serving an electronic receipt documenting the transaction to the first computing device, the second computing device, or a combination thereof.

The flowchart in FIG. 5 illustrates the architecture, functionality, and operation of possible implementations of systems, methods, and computer program products according to certain embodiments of the present invention. In this regard, each block in the flowchart may represent a module, segment, or portion of code, which comprises one or more executable instructions for implementing the specified logical function(s). It will also be noted that each block of the flowchart illustration, and combinations of blocks in the flowchart illustration, may be implemented by special purpose hardware-based systems that perform the specified functions or acts, or combinations of special purpose hardware and computer instructions.

It should also be noted that, in some alternative implementations, the functions noted in the blocks may occur out of the order noted in the Figure. In certain embodiments, two blocks shown in succession may, in fact, be executed substantially concurrently, or the blocks may sometimes be executed in the reverse order, depending upon the functionality involved. Alternatively, certain steps or functions may be omitted if not needed.

Figure 6:
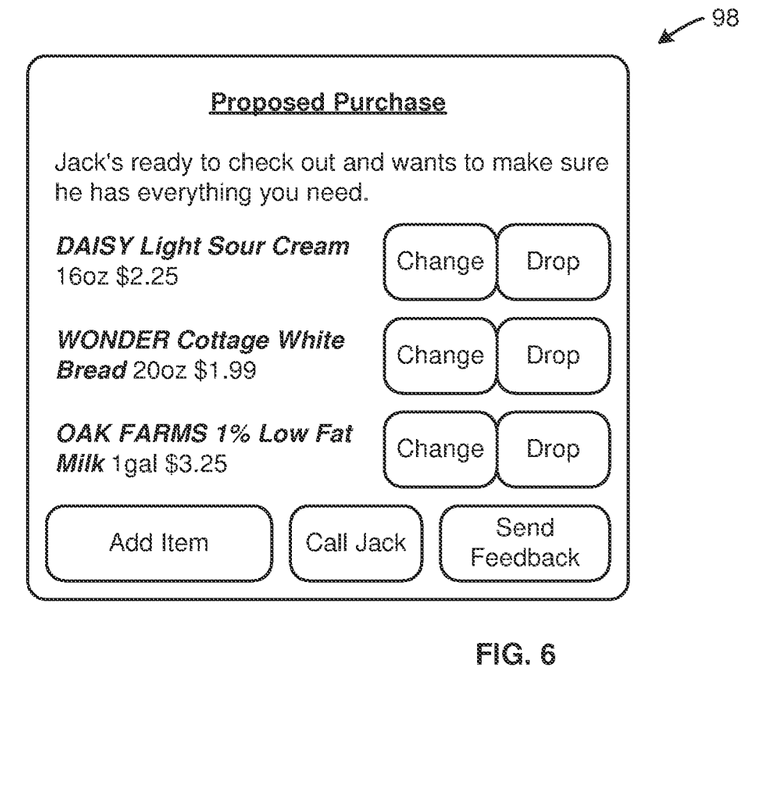
FIG. 6 is a schematic block diagram of one embodiment of an image or user interface that may be presented to a secondary customer in accordance with the present invention.

Referring to FIG. 6, a description 14 of a proposed purchase may be presented to a secondary customer 10*b* in any suitable manner. In selected embodiments, a description 14 may be presented to a secondary customer 10*b* via an image 98 or user interface 98 displayed by a corresponding computing device. The image 98 or user interface 98 may have any suitable layout. For example, in certain embodiments, the image 98 or user interface 98 may communicate that the primary customer 10*a* proposes to purchase one or more products and list each proposed product in association with an option (e.g., a button) to change the product, drop the product, or the like or a combination thereof.

Should a secondary customer 10*b* select a "change" option or the like, he or she may be supported in his or her efforts to document exactly what change is desired. This may be done by enabling a secondary customer 10*b* to type in some text (e.g., "Please get the WONDER Stoneground 100% Whole Wheat Bread instead"), browse and select an alternative product, name search and select an alternative product, or the like or a combination or sub-combination thereof.

Should a secondary customer 10*b* select a "drop" option or the like, he or she may be supported in his or her efforts to communicate that the corresponding product is not needed or desired. This may be done by enabling a secondary customer 10*b* to type in some text (e.g., "I don't think our guests drink wine"), find and select a canned statement (e.g., select a "We already have this" button), simply delete the product, or the like.

In certain embodiments, an image 98 or user interface 98 may present one or more other options or commands to a secondary customer 10*b*. For example, an image 98 or user interface 98 may present or offer an "add item" option, "call" option, "send feedback" option, or the like or a combination or sub-combination thereof.

Should a secondary customer 10*b* select an "add item" option or the like, he or she may be supported in his or her efforts to document exactly what addition is desired. This may be done by enabling a secondary customer 10*b* to type in some text (e.g., "Please get some milk too"), browse and select an additional product, name search and select an additional product, or the like or a combination or sub-combination thereof.

Should a secondary customer 10*b* select a "call" option or the like, he or she may be supported in his or her efforts to call the appropriate primary customer 10*a* directly. For example, selection of the option may result in immediate dialing (e.g., on a computing device of the secondary customer 10*b*) of a mobile telephone number corresponding to the primary customer 10*a*. In this manner, the secondary customer 10*b* may orally deliver feedback 16 directly to the primary customer 10*a*.

Should a secondary customer 10*b* select a "send feedback" option or the like, he or she may be supported in his or her efforts to finalize the feedback 16 entered previously and send it to the primary customer 10*a*. For example, if the only feedback 16 was a selection of a drop option for the DAISY Light Sour Cream, the selection of the send feedback option may result in a message stating "Jill does not want you to purchase the DAISY Light Sour Cream" or the like. If no modifications to a proposed purchase are entered, selection of a send feedback option may result in a message stating "Jill has suggested no changes to your proposed purchase" or the like. Alternatively, an image 98 or user interface 98 may include a "Looks Good" or "No Changes Needed" option.

Figure 7:
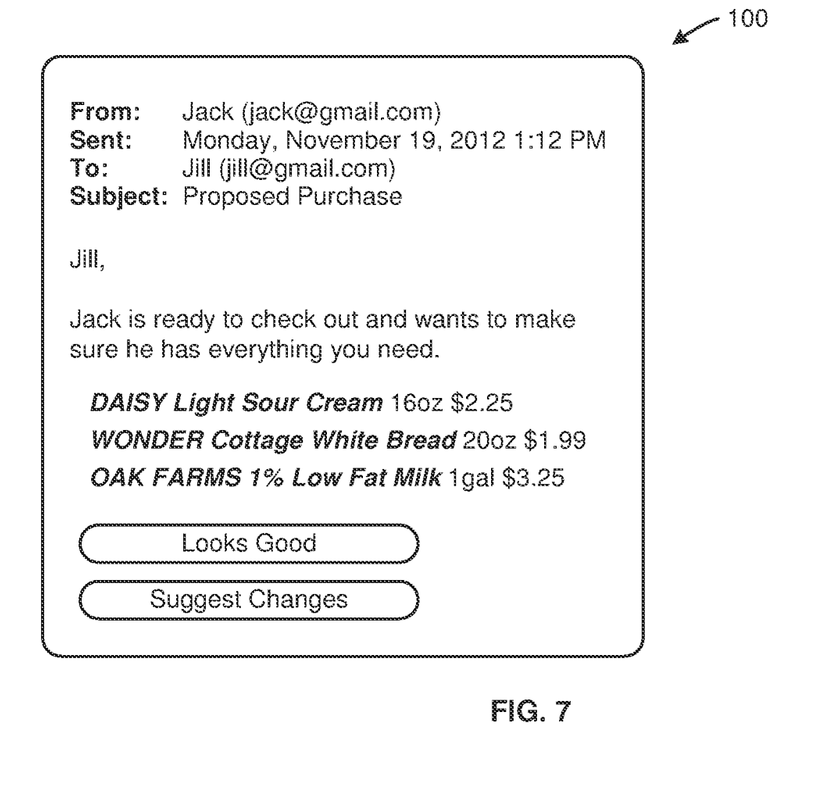
FIG. 7 is a schematic block diagram of one embodiment of a message that may be presented to a secondary customer in accordance with the present invention.

Referring to FIG. 7, in selected embodiments, a description 14 may be presented to a secondary customer 10*b* via an email message 100, SMS message, MMS message, or the like. The message 100 may have any suitable format, layout, or content. For example, in certain embodiments, the message 100 may communicate that the primary customer 10*a* proposes to purchase one or more products and list each proposed product in association with an option (e.g., a button) to approve of the proposed purchase, suggest one or more changes to the proposed purchase, or the like or a combination thereof.

Should a secondary customer 10*b* select a "Looks Good" option or the like, feedback 16 sent to a corresponding primary customer 10*a* may comprise a message stating "Jill has suggested no changes to your proposed purchase" or the like. Alternatively, should a secondary customer 10*b* select a "Suggest Changes" option or the like, he or she may be supported in his or her efforts to document exactly what change is desired. In selected embodiments, this may be done by providing a link that may direct a secondary customer 10*b* to a web interface where a secondary customer 10*b* may type in some text (e.g., "Please get the WONDER Stoneground 100% Whole Wheat Bread instead"), browse and select an alternative or additional product, name search and select an alternative or additional product, suggest the deletion of one or more products, authorize a computer system to send the feedback to the primary customer 10*a*, or the like or a combination or sub-combination thereof.

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

What is claimed is:

1. A computer-implemented method for enabling pre-purchase feedback, the method comprising:
   supporting, by a retailer, a software application and a computer system that are proprietary to the retailer;
   receiving, within a brick-and-mortar store of the retailer, a primary customer carrying a first computing device, the first computing device having installed thereon a first instance of the software application;
   activating the first instance of the software application installed on the first computing device upon receiving the primary customer within the brick-and-mortar store of the retailer;
   receiving, by the computer system from the primary customer via the first instance while the primary customer is within the brick-and-mortar store, an instruction to share with a secondary customer data describing a proposed purchase of one or more products;
   passing, by the computer system, the data to a second computing device corresponding to the secondary customer; and
   receiving, by the computer system from the secondary customer via the second computing device, a request to add or remove at least one item to or from the proposed purchase;
   passing, by the computer system, the request to the first instance; and
   adding or removing, by the first instance, the at least one item to or from the proposed purchase in accordance with the request.

2. The method of claim 1, wherein the computer system comprises a point-of-sale system contained within the brick-and-mortar store.

3. The method of claim 2, further comprising completing, by the point-of-sale system after the passing of the request, a purchase transaction involving the primary customer.

4. The method of claim 3, further comprising delivering, by the computer system via the first instance, receipt data documenting the purchase transaction to the first computing device.

5. The method of claim 1, wherein the second computing device has installed thereon a second instance of the software application.

6. The method of claim 5, wherein the passing of the data to the second computing device comprises delivering the data to the second instance.

7. The method of claim 6, wherein the receiving the request comprises receiving the request via the second instance.

8. The method of claim 7, wherein the first computing device comprises a first mobile telephone.

9. The method of claim 5, further comprising storing, by the computer system, information linking the first instance to the second instance.

10. The method of claim 1, further comprising:
    completing, by the retailer after the passing of the request, a purchase transaction involving the primary customer; and
    delivering, by the computer system via the first instance, receipt data documenting the purchase transaction to the first computing device.

11. The method of claim 1, wherein the passing the data to the second computing device comprises passing the data to the second computing device while the secondary customer is located outside of the brick-and-mortar store.

12. A computer-implemented method for enabling pre-purchase feedback, the method comprising:
    supporting, by a retailer, a software application and a computer system that are proprietary to the retailer;
    storing, by the computer system, information linking a first instance of the software application to a second instance of the software application, the first instance being installed on a first mobile computing device, the second instance being installed on a second mobile computing device;
    activating the first instance of the software application installed on the first computing device upon receiving the primary customer within the brick-and-mortar store of the retailer;
    receiving, by the computer system from the first instance, an instruction to share with the second instance data describing a proposed purchase from the retailer of the one or more products;
    passing, by the computer system, the data to the second instance piecemeal such that each product of the one or more products is passed to the second instance in real time as that product is (1) checked off a shopping list on the first instance or (2) scanned by the first mobile computing device into the first instance.

13. The method of claim 12, further comprising receiving, by the computer system from the second instance, a request to add or remove at least one product to or from the proposed purchase.

14. The method of claim 13, further comprising passing, by the computer system, the request to the first instance.

15. The method of claim 14, further comprising completing, by the computer system after the passing of the request, a purchase transaction involving the primary customer.

16. The method of claim 15, further comprising delivering, by the computer system, receipt data documenting the purchase transaction to the first instance.

17. The method of claim 16, wherein the purchase transaction is in accordance with the request and is, as a result, different from the proposed purchase.

18. A method for enabling pre-purchase feedback, the method comprising the steps of:
    activating a first instance of a software application installed on a first computing device of a primary customer within a brick-and-mortar store of a retailer;
    receiving, by a computer system from the first computing device of the primary customer, a description of a proposed purchase of one or more products;
    receiving, by the computer system from the first computing device of the primary customer via the first instance, an instruction to share with a secondary customer the description of the proposed purchase of the one or more products;
    passing, by the computer system, the description of the proposed purchase to a second computing device of the secondary customer;
    receiving, by the computer system from the second computing device, feedback from the secondary customer regarding the one or more products of the proposed purchase, the feedback confirming whether the proposed purchase contains the correct one or more products or confirming whether the proposed purchase contains all of the one or more products of the proposed purchase;
    passing, by the computer system, the feedback to the first instance of the first computing device; and
    utilizing the feedback from the secondary customer to i) modify the proposed purchase by adding or removing one or more products from the proposed purchase or ii) leave the proposed purchase unchanged.

* * * * *